United States Patent
Simoes

(10) Patent No.: US 6,647,894 B1
(45) Date of Patent: Nov. 18, 2003

(54) CAR WASH WHEEL PUSH ROLLER DOLLY

(76) Inventor: Jose Luis Simoes, 16867 Stoneglass St., Tustin, CA (US) 92780

( * ) Notice: Subject to any disclaimer, the term of this patent is extended or adjusted under 35 U.S.C. 154(b) by 0 days.

(21) Appl. No.: 10/141,196

(22) Filed: May 9, 2002

(51) Int. Cl.$^7$ .................................................. B61B 7/00
(52) U.S. Cl. ............................... 104/172.1; 104/172.3; 198/732
(58) Field of Search .......................... 104/172.3, 172.1, 104/172.5, 165, 162, 178; 198/732

(56) References Cited

U.S. PATENT DOCUMENTS

| | | | | |
|---|---|---|---|---|
| 2,132,455 A | * | 10/1938 | Bishop ....................... | 198/732 |
| 2,988,014 A | * | 6/1961 | Pianowski ................... | 104/162 |
| 4,194,449 A | | 3/1980 | Breau | |
| 4,374,496 A | * | 2/1983 | Hanna ...................... | 104/172.3 |
| 4,715,287 A | * | 12/1987 | Wentworth et al. ...... | 104/172.3 |
| 4,873,929 A | | 10/1989 | Witecki | |
| 4,930,424 A | | 6/1990 | Astley | |
| 5,140,910 A | * | 8/1992 | Welter ...................... | 104/172.3 |
| 6,186,073 B1 | * | 2/2001 | Reitsch, Jr. .............. | 104/172.1 |

* cited by examiner

*Primary Examiner*—S. Joseph Morano
*Assistant Examiner*—Frantz F. Jules
(74) *Attorney, Agent, or Firm*—Gordon K. Anderson

(57) ABSTRACT

A car wash wheel push roller dolly (20) is used for transporting a vehicle by pushing the vehicle wheel on a horizontal track in a car wash system consisting basically of a polyurethane dolly body (22) with an integrally formed upward portion (36) and a gusset (38) connecting the front to the rear. A front axle (40), a first rear axle (42) and a second rear axle (44) are all integrally formed with the dolly body and extend outwardly from each side of the body at right angles. Each distal end of the axles include a groove (46) adjacent to their ends. A pair of front rollers (50) are disposed on the front axle, next to a pair of conveyer chain links (48) also a pair of first rear rollers (52) and second rear rollers (54) engage their respective axles with all of the rollers attached with retaining rings (60). When a vehicle is positioned on the car wash endless chain conveyer horizontal track (58) and the chain links are attached to the endless chain, the vehicle may be pushed forward by the dolly. The dolly interfaces with the conveyer system with the front rollers positioned beneath the track, the first rear rollers engage track top and the second rear rollers engage the tire vehicle wheel (56) on the track top, the vehicle is then propelled thought the car wash by the chain.

16 Claims, 5 Drawing Sheets

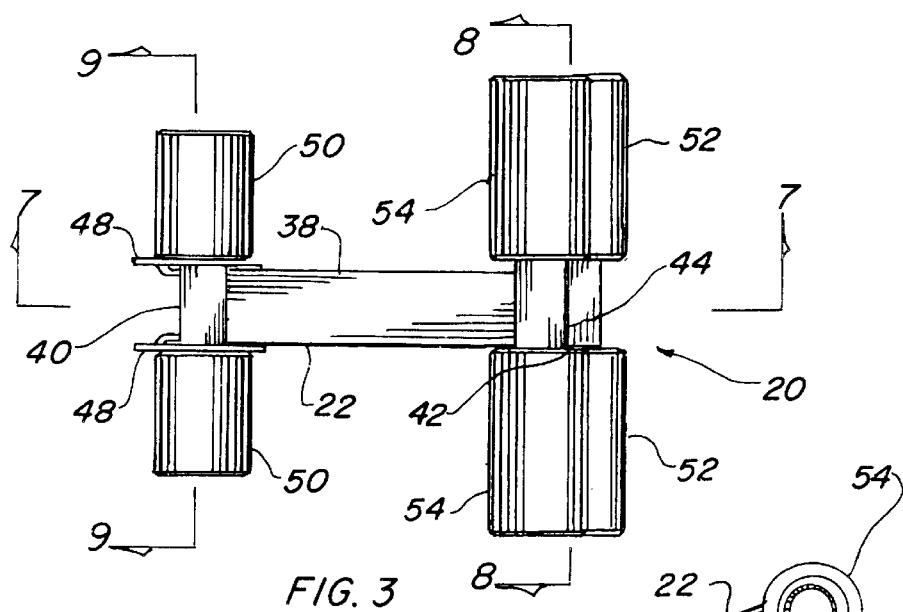
FIG. 3
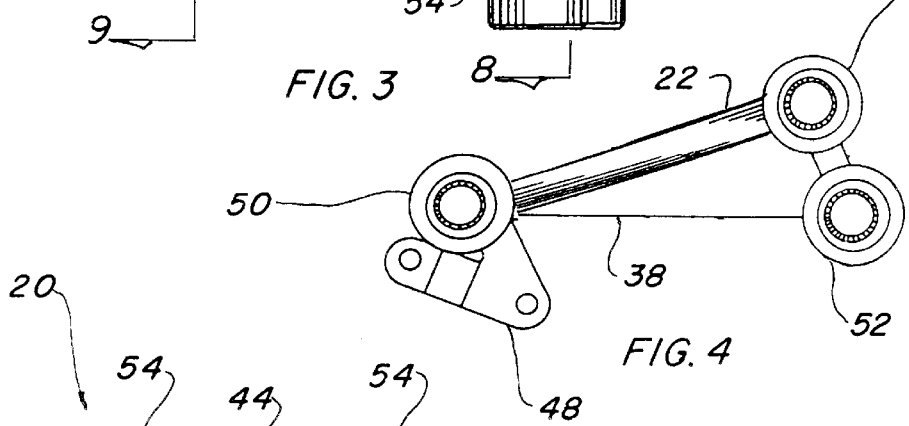
FIG. 4
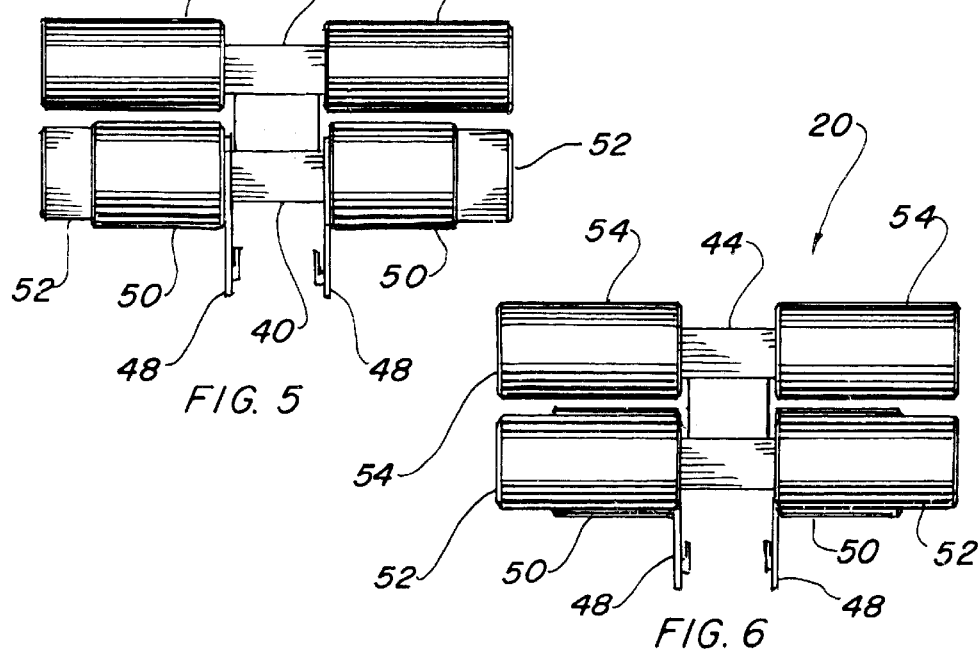
FIG. 5
FIG. 6

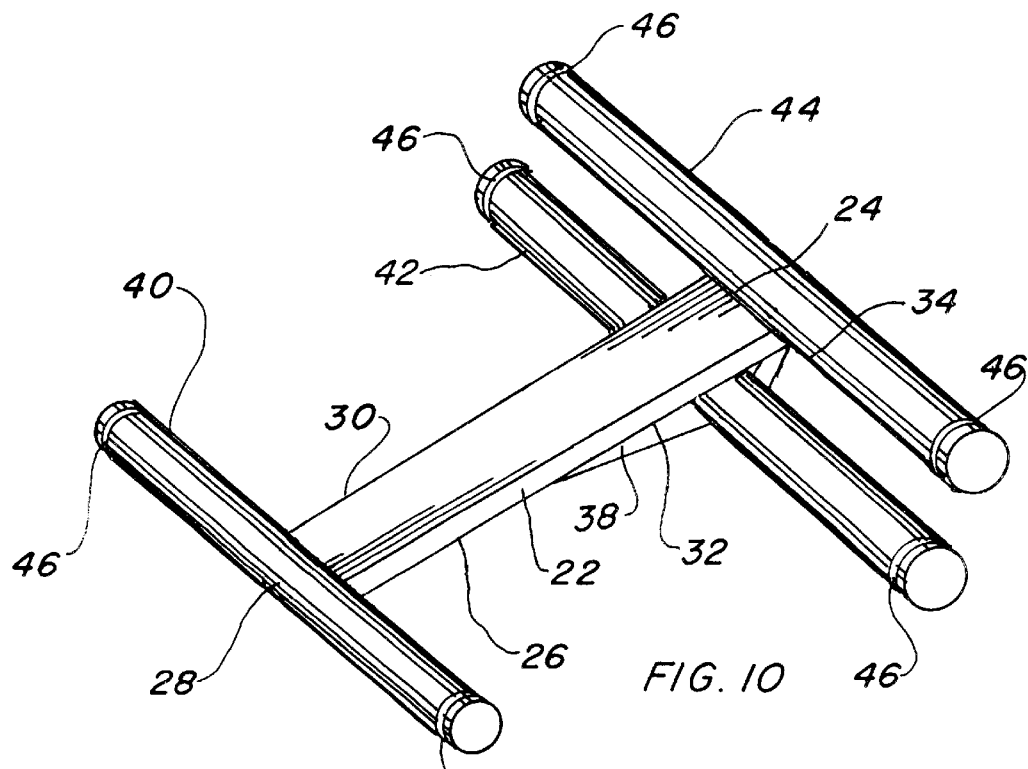
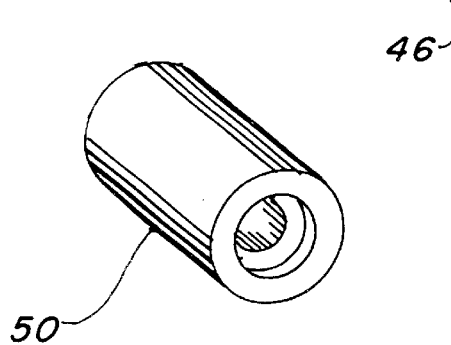
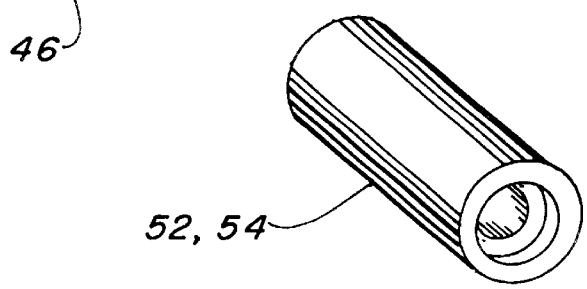
FIG. 11      FIG. 12
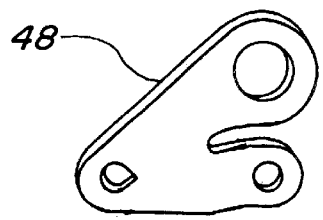
FIG. 13      FIG. 14      FIG. 15

CAR WASH WHEEL PUSH ROLLER DOLLY

TECHNICAL FIELD

The present invention relates to automotive wheel pushing roller dolly's in general. More specifically to a thermoset plastic roller dolly for use in a conveyor chain driven car wash system.

BACKGROUND ART

Previously, many types of dolly's have been used in endeavoring to provide an effective means to propel an automobile through a car wash using a continuous conveyor belt. The car wash industry usually employs dolly's with multiple rollers supporting an arm with the trailing end maintained within the track with a pair of rollers. One or more connectors attach the dolly to the continuous chain moving the dolly along the track of the conveyor system.

The prior art described below did not disclose any patents that possess the novelty of the instant invention, however the following U.S. patents are considered related:

| U.S. Pat. No. | Inventor | Issue Date |
| --- | --- | --- |
| 5,140,910 | Weiter | Aug. 25, 1992 |
| 4,930,424 | Astley | Jun. 5, 1990 |
| 4,873,929 | Witecki | Oct. 17, 1989 |
| 4,194,449 | Breau | Mar. 25, 1980 |

Weiter in U.S. Pat. No. 5,140,910 teaches a dolly for pushing a automobile through a car wash having an inclined arm with a leading end located below the track and attached to the conveyor chain. A pair of track engaging rollers are positioned below the track and trailing rollers are supported by the track. The elevated pair of rollers engage the vehicle wheel with the load imparted to the track. A floating mounting engagement maintains the contact regardless of wear.

U.S. Pat. No. 4,930,424 issued to Astley is for a conveyer chain guide that includes a pusher dolly connected to a power driven endless chain. The dolly includes an upright arm that extends through and is mounted onto the track. A link interconnects the arm and chain for movement in unison. The chain guide is under the track and arranged on the longitudinal axis. Each chain guide receives the chain and maintains it in registry with the axis against lateral deflection.

U.S. Pat. No. 4,873,929 Witecki in U.S. Pat. No. 4,873,929 discloses a pusher unit that has three axles and six wheels designed for use with at car wash system utilizing a endless chain moving under a slotted track. The pusher unit uses a straight bar projecting out of the track with track contacting rollers positioned at the end of the bar. Wire engaging rollers are located at an intermediate position with the tire contacting rollers formed without internal insetting and are held in place by threaded fasteners. The under track rollers are secured to a removable axle which is mounted in a sleeve that is welded to the end of the bar. The wheels are held in place with machine screws. A second embodiment is for a hollow tubular bar using a third axle received through side holes.

U.S. Pat. No. 4,194,449 issued to Breau teaches a double dolly for use with a conveyor. The dolly has a first roller and a second support roller and a safety bar in advance of the first roller along with a frame for securing the rollers and the bar. The first roller engages the object and the second roller contacts the surface of the conveyor. The safety bar blocks the gap between the supporting surface and the first roller. The rotatability of the safety bar prevents its binding on the supporting surface in event of the dolly tipping.

DISCLOSURE OF THE INVENTION

In the car wash industry under track continuous conveyer chains move automobiles along a track by pushing one of the cars wheels through the washing apparatus. In this type of system a chain is attached to a dolly having multiple rollers with a support arm that includes a pair of rollers on the front that rolls along the underside of the track and a pair of rollers interfacing the top of the track. A third pair of rollers engage the automobile wheel allowing the propelling force of the chain to move the vehicle. This system is widely used and has proven to be a successful in the industry. The most manifest problem is that the dolly is subjected to substantial loads and an extremely severe environment. Further the conventional dolly's are fabricated of a metal bar with axles welded on each end and threaded fasteners holding the wheels in place. While the operation is acceptable the dolly's are prone to wear and because of their rigid nature are subject to fracturing and yielding usually within or adjacent to the weld joint. It is therefore a primary object of the invention to utilize a dolly that is made almost entirely of a thermoset plastic material. By the use of a structurally strong urethane plastic the dolly will not break as easy as metal since it is sufficiently resilient to allow it to deflect slightly rather than break when subjected to an overload and is much more durable. The body of the invention utilizes a urethane elastomer which can be either thermoset or thermoplastic, while either form may be employed a thermoset material of casting resins is preferred using a prepolymer and casting agents that are cast into a heated mold. After hardening the dolly body is demolded and cured.

An important object of the invention using a urethane elastomer for the dolly body is that it is extremely light in weight compared to steel, as steel has a specific gravity of 7.83 compared to urethanes 1.20, which means that the plastic is some 6 ½ times lighter than the welded steel body. The reduced weight permits easier handling and the shipping expense is considerably reduced.

Another object of the invention has to do with the overall expense of the complete dolly as it is cost effective relative to the all steel construction. A conventional dolly is made of two pieces of steel bar welded together with three axles at the exact locations which require a jig or fixture to maintain the necessary alignment. Cutting and welding solid steel bar stock is time consuming. Also drilling and tapping six places is labor intensive as the operation is normally accomplished on a single piece basis. The cost of a mold can be amortized over a long period of time and the material cost of the urethane elastomer is less to start with than the metal. All in all the invention is indeed a cost tremendous cost saving to the operator of a car wash equipped with the under chain conveyer and also to the original equipment manufacturer since multiple dolly's are required with each system.

Still another object of the invention is realized in using a unitary dolly body since there are no welds to crack or break, further the steel axle, in the past, has had a tendency to wear near the support bar where the roller continually rotates. The invention has no such welds and the urethane elastomer is formulated to be self-lubricating as well as handling shock and vibration loads thus eliminating the wear between the roller and the axle.

Yet another object of the invention is in the addition of a gusset for added strength as it will handle more weight and it flexibly yields instead of fracturing. It has been anticipated that the load capabilities would exceed 12,000 pounds (5,448 kg). The location of the gusset is in direct alignment with the front and second, or upper axle, which transfers the load linearly therebetween in tension offsetting the cantilever load of the prior art.

A further object of the invention is the ease of attaching the rollers with a snap ring. The use of a snap ring, or more precisely a retaining ring, in a groove within the distal end of each axle is easy to accomplish with common internal retaining ring pliers. To assure that the ring stays in place a secondary securing means is provided in the form of flat round push nut that simply slides over the axle and holds firmly with a plurality of barbs under tension gripping the peripheral surface of the axle.

A final object of the invention its non corrosive nature, since both the dolly body and rollers are fabricated of a material that is impervious to oxidation in the form of rust and it is inert to most chemicals, at least the type found in the car was environment. The only metallic components are the retaining rings and the push nuts both of which are stainless steel.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a top elevation view of the preferred embodiment.

FIG. 4 is a side elevation view of the preferred embodiment.

FIG. 5 is a front elevation view of the preferred embodiment.

FIG. 6 is a rear elevation view of the preferred embodiment.

FIG. 10 is a partial isometric view of the dolly body shown by itself, completely removed from the invention for clarity.

FIG. 11 is a partial isometric view of the front roller shown by itself, completely removed from the invention for clarity.

FIG. 12 is a partial isometric view of the rear roller shown by itself, completely removed from the invention for clarity.

FIG. 13 is a partial isometric view of the retaining ring shown by itself, completely removed from the invention for clarity.

FIG. 14 is a partial isometric view of the flat round push nut shown by itself, completely removed from the invention for clarity.

FIG. 15 is a partial isometric view of the conveyer chain link shown by itself, completely removed from the invention for clarity.

BEST MODE FOR CARRYING OUT THE INVENTION

Figure 1:
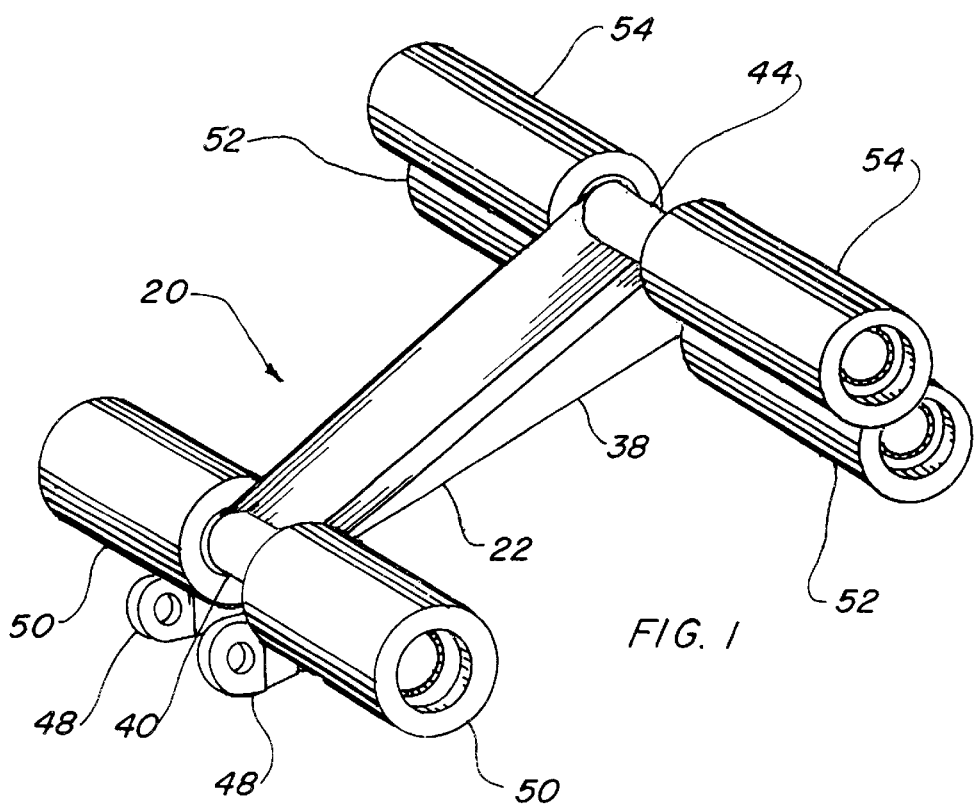
FIG. 1 is a partial isometric view of the preferred embodiment.

The best mode for carrying out the invention is presented in terms of a preferred embodiment. This preferred embodiment is shown in FIGS. 1 thorough 16 and is comprised of a car wash wheel push roller dolly 20 that is used in conjunction with a car wash endless chain conveyer. The dolly 20 transports a vehicle by pushing on a wheel that is resting on a horizontal track positioned above the chain in a presently operated typical car wash system.

The main element in the dolly 20 is an integrally formed rectangular dolly body 22, as illustrated in FIGS. 1–10 particularly FIG. 10 where it is shown by itself The dolly body 22 is characterized as having a top 24, a bottom 26, a front 28, a right side 30, a left side 32 and a rear 34 with an upward portion 36 on the rear 34 positioned at an acute angle relative to the body 22. The dolly body 22 includes a gusset 38 integrally molded onto the top of the body 22 between the front 28 and the rear 34 greatly increasing the dolly body's structural integrity. As previously mentioned the gusset 38 linearly connects the front to the upward portion 36 at the rear 34 of the body 22 directly transferring the load from one end to the other while stiffening the entire structure at the same time. The basic shape of the dolly body 22 is preferably rectangular with the gusset 38 flat and essentially one third the width of the body 22 at its interfacing point. As illustrated the body 22 has almost sharp angular corners however the corners may be radiused and the shape may vary from the rectangular configuration to other profiles with no changes in the scope of the invention.

A front axle 40 is integrally formed with the dolly body 22 and extends outwardly from each of its sides 30 and 32, at right angles to the end of the body front 28. The front axle 40 is round and retains its shape throughout its length.

A first rear axle 42 is also integrally formed with the dolly body 22 and likewise extends outwardly from each side 30 and 32 at the end of the body rear 34, at right angles to the dolly body 22. The first rear axle 43 is longer than the front axle 40 and has a slightly larger diameter since it is cantilevered further from the body 22.

A second rear axle 44 is integrally formed with the upward portion 36 of the dolly body 22 and also extends outwardly from each side 30 and 32 of the rear 34 of the body upward portion 36 at right angles. The second rear axle 44 is the same length as the first rear axle 43 and has the same diametrical configuration.

Figure 8:
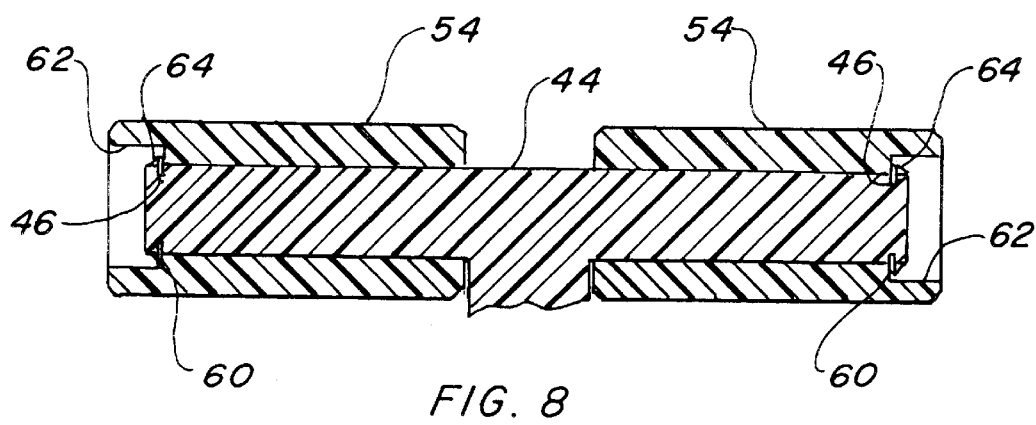
FIG. 8 is a cross sectional view taken along lines 8—8 of FIG. 3.
Figure 9:
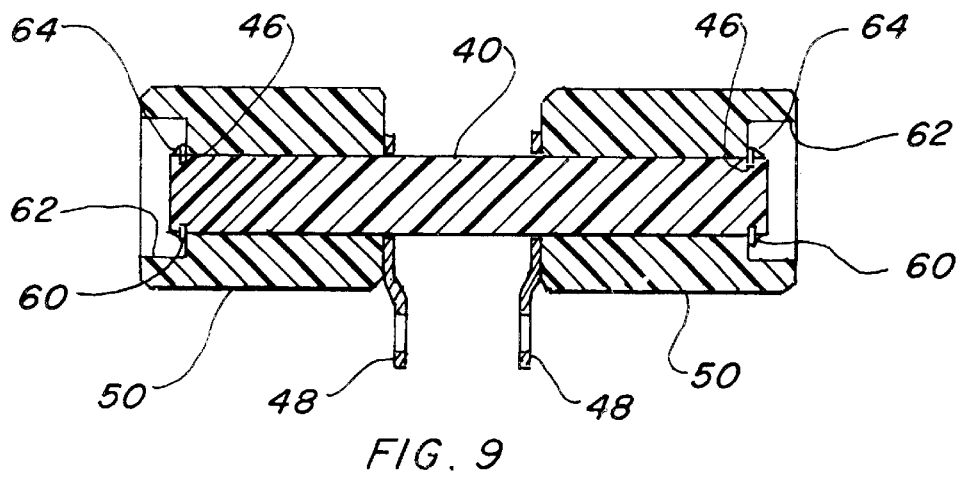
FIG. 9 is a cross sectional view taken along lines 9—9 of FIG. 3.
Figure 16:
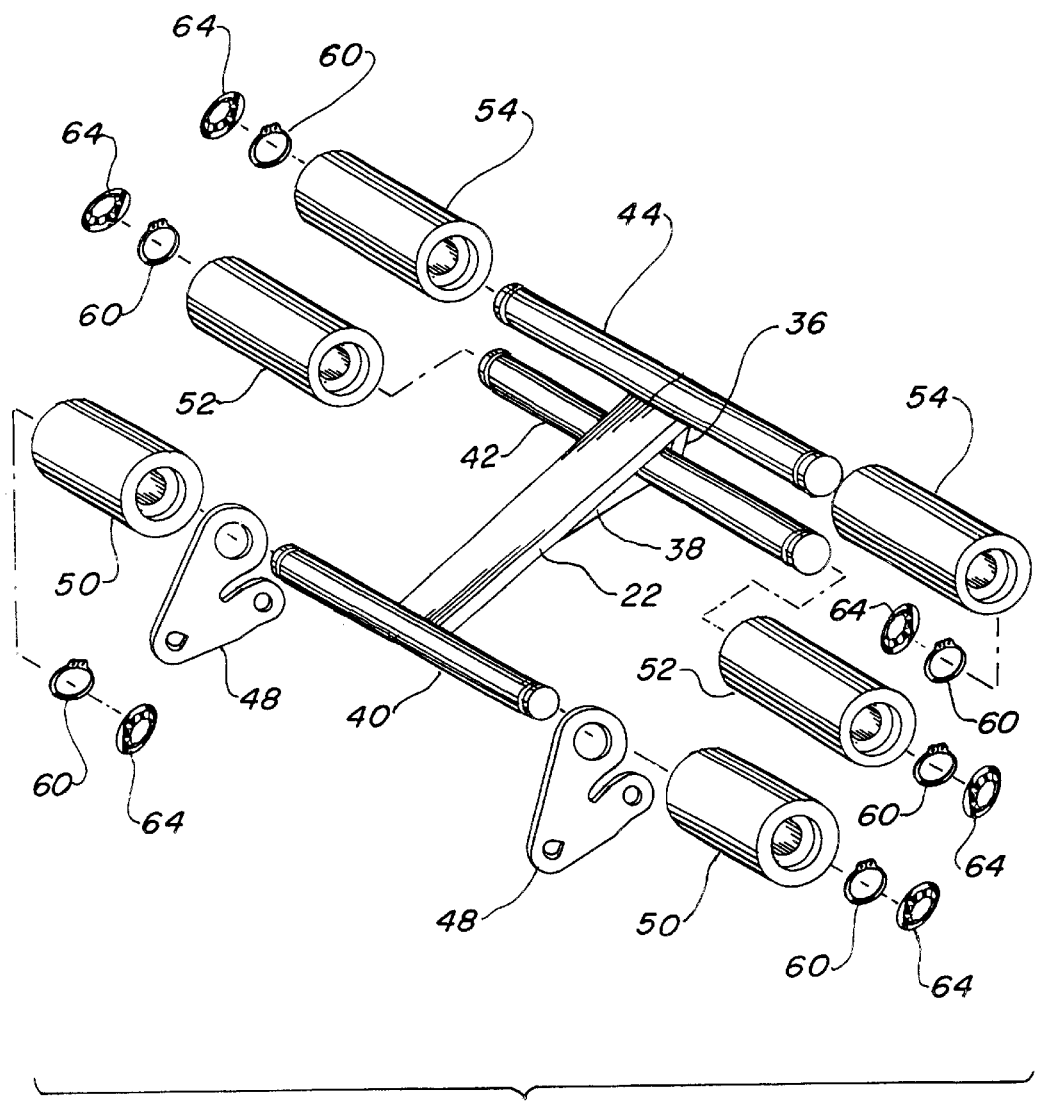
FIG. 16 is an exploded view of the preferred embodiment of the invention.

All of the distal ends of the axles 40, 42 and 44 contain a groove 46 near the end as illustrated in FIGS. 8–10 with the body 22, including the gusset 38 and integral axles 42, 44 and 46 shown as a unitary molded element in FIG. 10.

The car wash wheel push roller dolly body 22 is fabricated of a thermoset plastic which is the most meaningful novelty of the invention. While many different plastics may be used such as a thermoplastic requiring injection molding, howerver a thermoset plastic is preferred in the form of reinforced polyurethane. Polyurethane plastic is created by the reaction of diisocyanates, which by themselves are very reactive, with compounds containing active hydrogens along with the addition of reinforcements and fillers or the like. The elastomer, as selected, has excellent durability, dimensional stability and economy when cast using heated molds and is ideal for the application as it is well suited for the environment of the car wash industry.

An opposed pair of conveyer chain links 48 are positioned on the front axle 40, one on each outwardly extending side, and are required for engaging the endless chain conveyer of the car wash. The chain links 48 are the requisite connection to the chain and while they are not plastic they are essential to make the necessary connections. The links 48 are commercially available and correspond to the configuration of the chain and include an offset and two attaching holes with the forward hole indexed to orient the connection. Each link 48 is made of stamped steel plate and has a bore corresponding to the diameter of the front axle 40. The link 48 simply slips over the axle next to the body 22 as illustrated in FIGS. 1, 3, 5 and 9 and is shown by itself removed from the invention in FIG. 15. While this link 48 is essential to the connection of the dolly it is not necessarily an integral part of the assembly as it may be added at a later date during installation of the dolly to the car washing system.

A pair of front rollers 50 are rotatably disposed on the front axle 40, one on each outwardly extending side, next to the conveyer chain links 48. The rollers 50 engage the underside of a car wash horizontal track 58.

A pair of first rear rollers 52 are joined to the first rear axle 42, again one on each outwardly extending side as above. The first rear rollers 52 engage the top surface of a car wash horizontal track 58.

Figure 2:
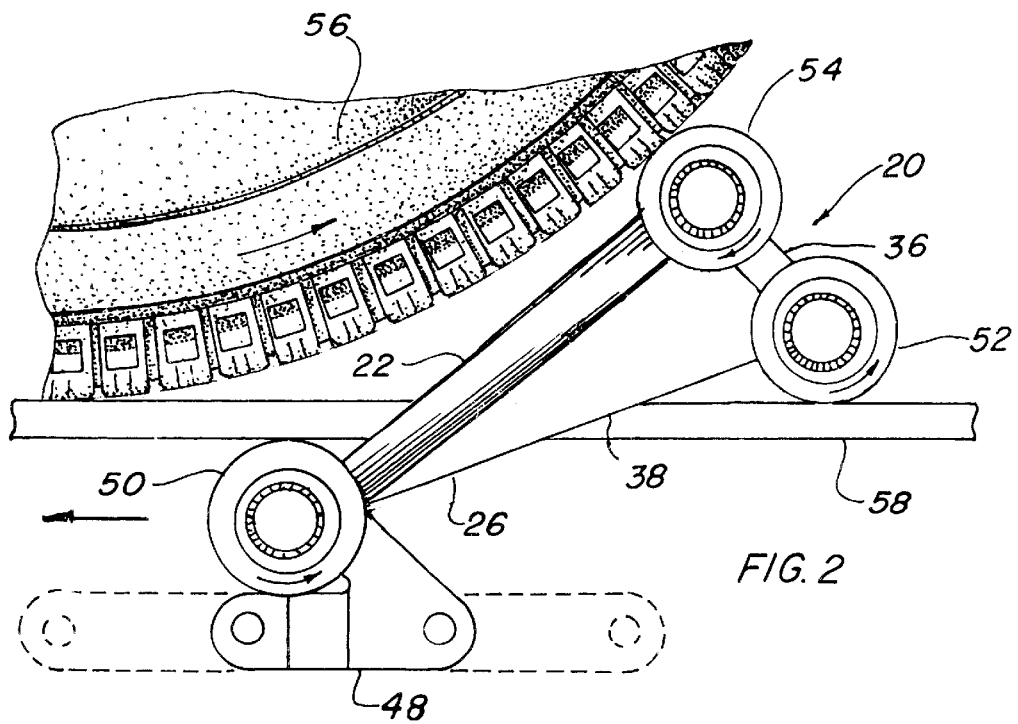
FIG. 2 is a side elevation view of the preferred embodiment installed in a car wash with the endless chain shown dotted and a automobile tire being pushed on a horizontal track.
Figure 7:
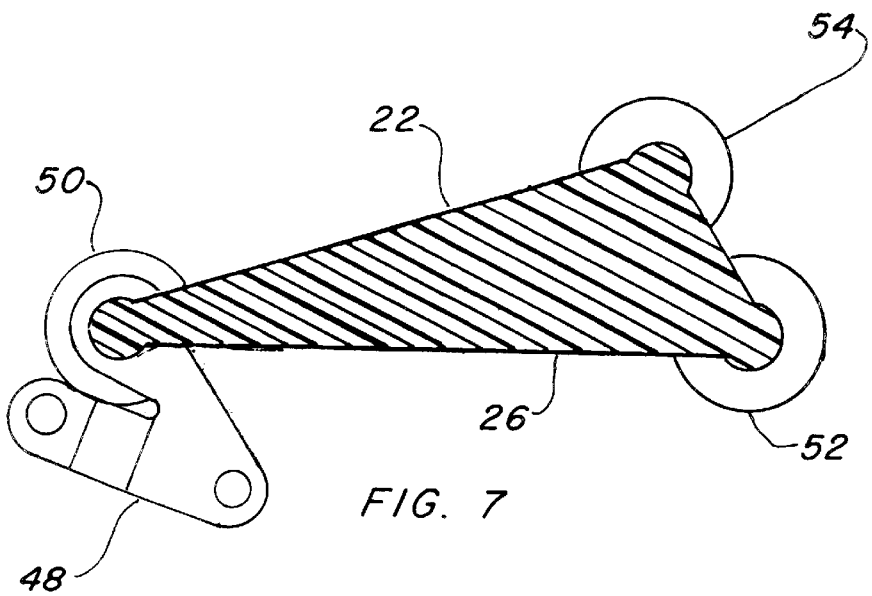
FIG. 7 is a cross sectional view taken along lines 7—7 of FIG. 3.

A pair of second rear rollers 54 are mounted on the second rear axle 44, in the same manner as above, for engaging a tire of a vehicle wheel 56 that is positioned on a car wash horizontal track 58, with all of the rollers shown attached in FIG. 2. This illustration also visually depicts their relationship with the car wash system as described above.

All of the rollers 50, 52 and 54 are fabricated of polyurethane which is known for its high impact resistance without deforming, abrasion resistance and wide operable temperature ranges. Of importance is the fact that they are self-lubricating and form their own bearing surface particularly in view the fact that the axles are fabricated of the same basic material.

A retaining ring 60 is located within the distal end groove 46 of each axle 40, 42 and 44, retaining each roller on the axle which permits unimpeded rotation of the rollers 50, 52 and 54. The retaining ring 60 is made of stainless steel and is the external type with tabs having holes therein adjacent to a split in the ring as shown in FIG. 13. The retaining ring 60 is well known in the art and easily installed and removed with common retaining ring pliers. The rollers 50, 52 and 54 each have a stepped shoulder 62 that the retaining ring 60 butts against as shown in FIGS. 8 and 9. A secondary securing means is also employed for additional assurance that the rollers will stay attached, in the form of a flat round push nut 64 that contiguously engages the retaining ring 60 on each axle distal end. This push nut 64 is not mandatory but adds a safety factor to the reliability of the dolly as it is time consuming and costly to shut down the car wash system to change a dolly that has had a roller come off.

It will be clearly seen that when a vehicle is positioned on the car wash endless chain conveyer horizontal track 58 and the chain links 48 are attached to the endless chain, the vehicle may be pushed forward by the dolly 20. As described above, when the front rollers 50 are positioned beneath the track 58, the first rear rollers 52 contiguously engage track top and the second rear rollers 54 engage a vehicle tire on the track top the vehicle is propelled thought the car wash.

While the invention has been described in complete detail and pictorially shown in the accompanying drawings, it is not to be limited to such details, since many changes and modifications may be made to the invention without departing from the spirit and scope thereof Hence, it is described to cover any and all modifications and forms which may come within the language and scope of the appended claims.

What is claimed is:

1. A car wash wheel push roller dolly adapted for use with a car wash having an endless chain conveyer and a horizontal track, for transporting a vehicle by urging a wheel, that is engaged on the car wash horizontal track, and positioned above the endless chain conveyer comprising, an integrally formed rectangular cross section dolly body having a top, a bottom, a front, a right side, a left side and a rear with an upward portion on said rear positioned at an acute angle relative to the base of the body, said dolly body having a gusset integrally molded onto the top of the body between the front and the rear increasing the dolly body's structural integrity, a front axle integrally formed with the dolly body extending outwardly from each side at right angles to the body front end, with each distal end having a groove therein, a first rear axle integrally formed with the dolly body extending outwardly from each side of the body rear end at right angles thereunto, with each distal end having a groove therein, a second rear axle integrally formed with the upward portion of the dolly body extending outwardly from each side of the rear of the body upward portion at right angles thereunto, with each distal end having a groove therein, an opposed pair of conveyer chain links positioned on said front axle, one on each outwardly extending side, for engaging the endless chain conveyer of a car wash, a pair of front rollers rotatably disposed on the front axle, one on each outwardly extending side, next to the conveyer chain links, for engaging the underside of the car wash horizontal track, a retaining ring positioned within the distal end groove of each front axle for retaining each roller on the corresponding axle permitting unimpeded rotation thereof, a pair of first rear rollers disposed on the first rear axle, one on each outwardly extending side, for engaging a top surface of the car wash horizontal track, a retaining ring positioned within the distal end groove of each first rear axle for retaining each roller on the corresponding axle permitting unimpeded rotation thereof, and a pair of second rear rollers disposed on the second rear axle, one on each outwardly extending side, for engaging the vehicle wheel positioned on the car wash horizontal track, a retaining ring positioned within the distal end groove of each second rear axle for retaining each roller on the corresponding axle permitting unimpeded rotation thereof, such that the vehicle is moved along the car wash endless chain conveyer horizontal track when the opposed chain links are attached to the endless chain conveyer, the front rollers are positioned beneath the track, the first rear rollers are contiguously engaging the top of the track and the second rear rollers engage the vehicle wheel on the top of the track.

2. The car wash wheel push roller dolly as recited in claim 1 wherein said rectangular dolly body and axles are thermoset plastic.

3. The car wash wheel push roller dolly as recited in claim 2 wherein said thermoset plastic comprises polyurethane.

4. The car wash wheel push roller dolly as recited in claim 1 further comprising a secondary securing means on each axle distal end.

5. The car wash wheel push roller dolly as recited in claim 4 wherein said secondary securing means on each axle distal end comprises a flat round push nut contiguously engaging said retaining ring.

6. The car wash wheel push roller dolly as recited in claim 1 wherein said pair of front rollers, said pair of first rear rollers and said pair of second rear rollers are polyurethane.

7. A car wash wheel push roller dolly adapted for use with a car wash having an endless chain conveyer and a horizontal track, for transporting a vehicle by urging a wheel engaged on the car wash horizontal track positioned above the endless chain conveyer comprising, an integrally formed rectangular cross section dolly body having a top, a bottom, a front, a right side, a left side and a rear with an upward portion on said rear positioned at an acute angle relative to the base of the body, said dolly body having a gusset integrally molded onto the top of the body between the front and the rear increasing the dolly body's structural integrity, a front axle integrally formed with the dolly body extending outwardly from each side at right angles to the body front end, a first rear axle integrally formed with the dolly body extending outwardly from each side of the body rear end at right angles thereunto, a second rear axle integrally formed with the upward portion of the dolly body extending outwardly from each side of the rear of the body upward portion at right angles thereunto, an opposed pair of conveyer chain links positioned on said front axle, one on each outwardly extending side, for engaging the endless chain conveyer of a car wash, a pair of front rollers rotatably disposed on the front axle, one on each outwardly extending side, next to the conveyer chain links, for engaging an underside of the car wash horizontal track, retaining means holding each roller on the corresponding axle in a freely rotating manner, a pair of first rear rollers disposed on the first rear axle, one on each outwardly extending side, for engaging a top surface of the car wash horizontal track, retaining means holding each roller on the corresponding axle in a freely rotating manner, a pair of second rear rollers disposed on the second rear axle, one on each outwardly extending side, for engaging the vehicle wheel positioned on the car wash horizontal track, retaining means holding each roller on the axle in a freely rotating manner, such that the vehicle is moved along a car wash endless chain conveyer horizontal track when the chain links are attached to the endless chain conveyer, the front rollers are positioned beneath the track, the first rear rollers are contiguously engaging the top of the track and the second rear rollers engage the vehicle wheel on the top of the track.

8. The car wash wheel push roller dolly as recited in claim 7 wherein said retaining means comprises a distal end of said front axle, first rear axle and second axle having a groove therein, with a retaining ring disposed within the groove retaining each roller on the axle in a revolving manner.

9. The car wash wheel push roller dolly as recited in claim 8 further comprising a secondary securing means on each axle distal end.

10. The car wash wheel push roller dolly as recited in claim 9 wherein said secondary securing means on each axle distal end further comprises a flat round push nut contiguously engaging said retaining ring.

11. The car wash wheel push roller dolly as recited in claim 7 wherein said pair of front rollers, said pair of first rear rollers and said pair of second rear rollers comprise a polyurethane construction.

12. A car wash wheel push roller dolly adapted for use with a car wash having an endless chain conveyer and a horizontal track, for transporting a vehicle by urging a wheel engaged on the car wash horizontal track positioned above the endless chain conveyer comprising, a rectangular cross section dolly body having a top, a bottom, a front, a right side, a left side and a rear with an upward portion on said rear positioned at an acute angle relative to the base of the body, said dolly body having a gusset on the top of the body between the front and the rear increasing the dolly body's structural integrity, a front axle integral with the dolly body extending outwardly from each side at right angles to the body front end, a first rear axle integrally formed with the dolly body extending outwardly from each side of the body rear end at right angles thereunto, a second rear axle integrally formed with the upward portion of the dolly body extending outwardly from each side of the rear of the body upward portion at right angles thereunto, with each distal end having a groove therein, a pair of front rollers rotatably disposed on the front axle, one on each outwardly extending side, for engaging an underside of the car wash horizontal track, retaining means holding each roller on the corresponding axle in a freely rotating manner, a pair of first rear rollers disposed on the first rear axle, one on each outwardly extending side, for engaging the top surface of a car wash horizontal track, retaining means holding each roller on the corresponding axle in a freely rotating manner, a pair of second rear rollers disposed on the second rear axle, one on each outwardly extending side, for engaging the vehicle wheel positioned on the car wash horizontal track, retaining means holding each roller on the corresponding axle in a freely rotating manner, such that the vehicle is moved along a car wash endless chain conveyer horizontal track when the wheel push roller dolly is attached to the endless chain conveyer, the front rollers are positioned beneath the track, the first rear rollers are contiguously engaging the top of the track and the second rear rollers engage the vehicle wheel on the top of the track.

13. The car wash wheel push roller dolly as recited in claim 12 wherein said retaining means comprises a distal end of said front axle, first rear axle and second axle having a groove therein, with a retaining ring disposed within the groove retaining each roller on the axle in a revolving manner.

14. The car wash wheel push roller dolly as recited in claim 13 further comprising a secondary securing means on each axle distal end.

15. The car wash wheel push roller dolly as recited in claim 14 wherein said secondary securing means on each axle distal end comprises a flat round push nut contiguously engaging said retaining ring.

16. The car wash wheel push roller dolly as recited in claim 12 wherein said pair of front rollers, said pair of first rear rollers and said pair of second rear rollers comprise a polyurethane construction.

* * * * *